United States Patent
Patil

(12) 
(10) Patent No.: US 7,103,853 B1
(45) Date of Patent: Sep. 5, 2006

(54) SYSTEM AND METHOD FOR DYNAMICALLY PRESENTING ACTIONS APPROPRIATE TO A SELECTED DOCUMENT IN A VIEW

(75) Inventor: Rajesh V. Patil, Northboro, MA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/045,916

(22) Filed: Jan. 9, 2002

(51) Int. Cl.
  *G06F 3/00* (2006.01)
  *G06F 9/00* (2006.01)
  *G06F 17/00* (2006.01)

(52) U.S. Cl. ............... 715/824; 715/825; 715/744; 715/810; 715/813; 715/811; 715/779

(58) Field of Classification Search .......... 715/825, 715/744, 810, 813, 811, 779, 824
  See application file for complete search history.

(56) References Cited

U.S. PATENT DOCUMENTS 5,745,112 A * 4/1998 Hirose ................. 715/769
6,433,800 B1 * 8/2002 Holtz .................. 715/835

OTHER PUBLICATIONS

DeJean, David, Revealing the Hidden Secrets of "hide-when", Sep. 1, 2000, pp. 1-13, www-10.lotus.com/ldd.today.nsf/Lookup/hidewhen.*
Sam's Teach Yourself Lotus Notes 4.6 in 24 Hours, Sams Publishing, 1998, pp. 67-69.*
Kreisle, Bill. "Teach Yourself Lotus Notes 4.5". MIS Press, NY, 1955. 147. [ISBN 1-55828-529-6].

* cited by examiner

*Primary Examiner*—Kristine Kincaid
*Assistant Examiner*—Ryan F. Pitaro
(74) *Attorney, Agent, or Firm*—Shelley M Beckstrand

(57) ABSTRACT

A system and method for presenting actions appropriate to successive selected document in a view. During action creation, a hide-when formula is determined with reference to the selected document for each dynamic action. During view creation, a plurality of actions applicable to the view are defined and, responsive to at least one action being a dynamic action, the view is characterized as to be evaluated. Responsive to user selection of a next document for presentation in the view, which next document is characterized as to be evaluated, actions appropriate to the view for this next document are presented.

3 Claims, 6 Drawing Sheets

US 7,103,853 B1

SYSTEM AND METHOD FOR DYNAMICALLY PRESENTING ACTIONS APPROPRIATE TO A SELECTED DOCUMENT IN A VIEW

BACKGROUND OF THE INVENTION

1. Technical Field of the Invention

This invention pertains to graphical user interfaces. More particularly, it relates to dynamically generating actions which can be performed on a selected document in a view.

2. Background Art

An action bar is a bar across the top of a Notes view or document that allows a user to execute agents, that is, sets of instructions, by clicking a button. An action is an agent that is specifically designed to be included in an action bar. In Lotus Notes, using an action builder dialog box, an interactive window may be designed to facilitate user control. One or more actions can be combined into an agent.

In form, view and folder design, agents support formula, simple action, LotusScript and JavaScript.

Previously, no matter which document is selected in a view, the actions which are displayed at the top of the view are the same. Some actions may be greyed out, but no matter which document is selected the same actions are greyed out as not selectable. Designers have not been able to display actions which apply to a particular document when that document is selected.

It is an object of the invention to provide an improved system and method for presenting actions which may be executed with respect to a document in a view.

It is an object of the invention to provide a system and method for dynamically evaluating actions which may be executed with respect to successive documents in a view.

It is an object of the invention to provide a system and method whereby actions which may be executed with respect to a view may be dynamically evaluated and selectively hidden or shown for successive view panel content.

SUMMARY OF THE INVENTION

A system and method for presenting actions appropriate to a selected document. During action creation, a hide-when formula is determined for each dynamic action. During view creation, a plurality of actions applicable to the view are defined and, responsive to at least one action being a dynamic action, the view is characterized as to be evaluated. Responsive to user selection of a next document for presentation in the view, which next document is characterized as to be evaluated, actions appropriate to the view for this next document are presented.

Other features and advantages of this invention will become apparent from the following detailed description of the presently preferred embodiment of the invention, taken in conjunction with the accompanying drawings.

BEST MODE FOR CARRYING OUT THE INVENTION

In accordance with a preferred embodiment of the invention, actions which can be performed on a selected document in a view may be dynamically applied to a particular document when that document is selected. Designers can create views and then hide/show actions at the top of the view based on conditions such as values in the document or values derived by formula from some of the fields in the document. Actions may be removed all together, but not just for the entire view, but based on document context. The action list is re-evaluated for each document as documents are selected by arrowing up/down or by clicking, and then the action gets removed if it doesn't apply, or gets added back if it does apply to the selected document.

Herein the term "document" is intended to be generic to anything that may be successively presented in a view content window and with respect to which a plurality of possible actions may be taken. This includes documents, to-do lists, calendar views, databases, spreadsheets, web views, and so forth.

A simple example is a "To Do" view, where some of the tasks are already completed and some are incomplete. It is not needed, and in fact confusing, to display both "mark complete" and "unmark complete" actions at the top of the view. Only one of these actions applies to a given document. In accordance with the present invention, designers can hide the action which does not apply. The same is true in calendar views where the user is either an owner or a participant— and both of the owner actions and participant actions need not be presented to a specific user. Users are not shown actions that result in "This is not valid for this document", which is annoying. Also, the number of actions presented to the user is reduced, which renders the action bar more logical and easier to interpret.

Figure 1:
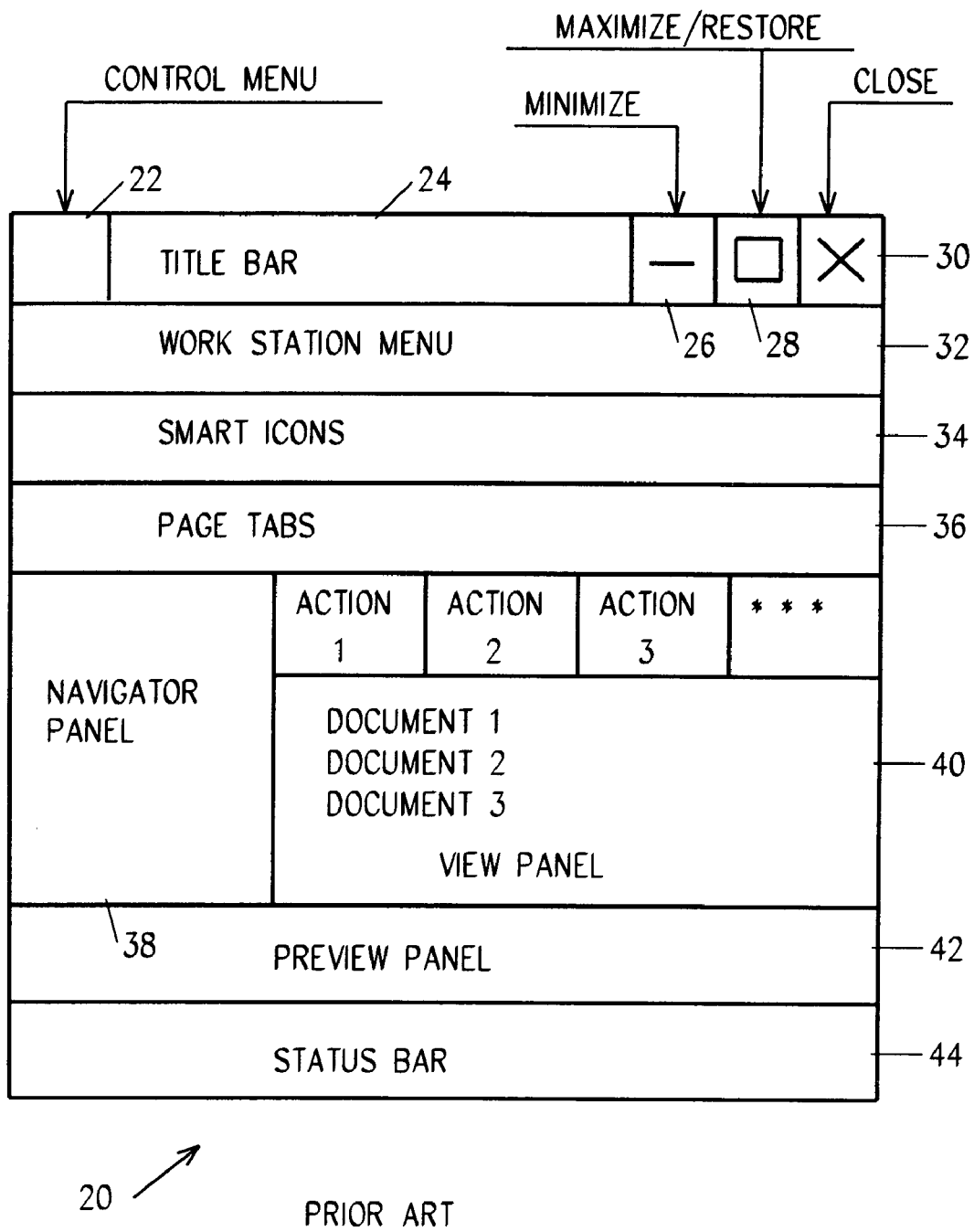
FIG. 1 is a schematic representation of a workstation user interface.

Referring to FIG. 1, a schematic representation of a workstation user interface is shown after the pattern of Lotus Notes. Interface 20 includes control menu icon 22, title bar 24, minimize icon 26, maximize/restore icon 28, close icon 30, work station menu bar 32, smart icon bar 34, page tabs 36, navigator panel 38, view panel 40, preview panel 42, and status bar 44. View panel 40 typically presents a list of documents and several action buttons for selecting various actions to perform on those documents. These component parts of a typical workstation user interface may be present in different combinations, configurations and positions, depending upon the application or database or view being presented, and generally have functions well known to those of skill in the art. While the interface 20 illustrated in FIG. 1 is representative of the Lotus Notes user interface, similar components exist in, for example, Microsoft Windows—to which the present invention is similarly applicable.

Figure 2:
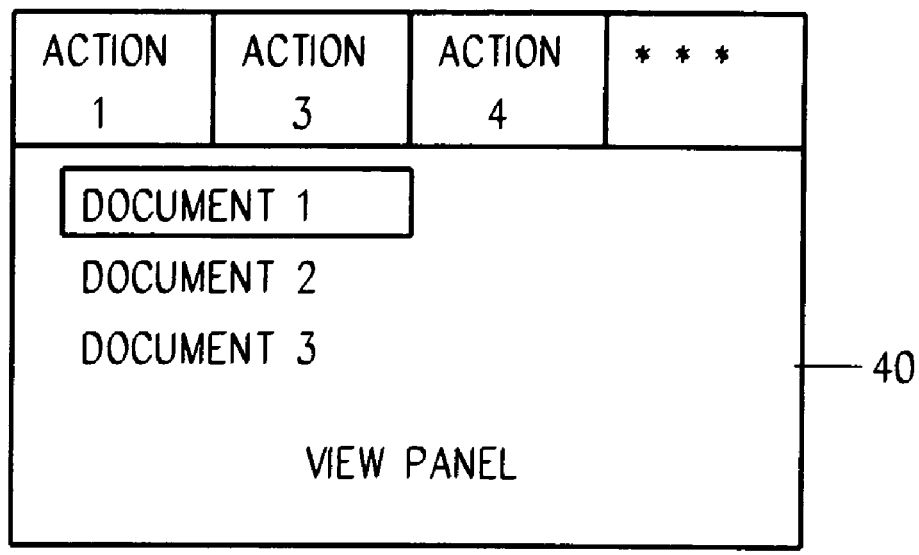
FIGS. 2 and 3 are schematic representations of views arranged according to a preferred embodiment of the invention for dynamically evaluating action list content for successive documents in a view.
Figure 3:
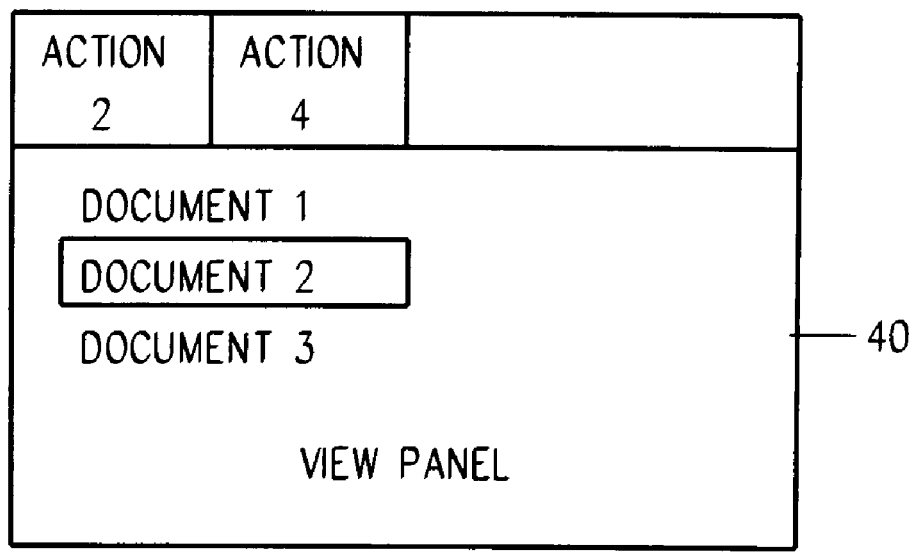

Referring to FIGS. 2 and 3, view panel 40 is presented in accordance with the preferred embodiment of the invention. In FIG. 2, document 1 has been selected and the actions displayed as applicable to that document include action 1, action 3, and action 4. Action 2 has been removed for the list, having evaluated as not pertinent. In FIG. 3, document 2 has been selected and the actions displayed as applicable to that document are action 2 and action 4. Action 2 has been restored to the set of actions, and action 3 deleted.

Figure 4:
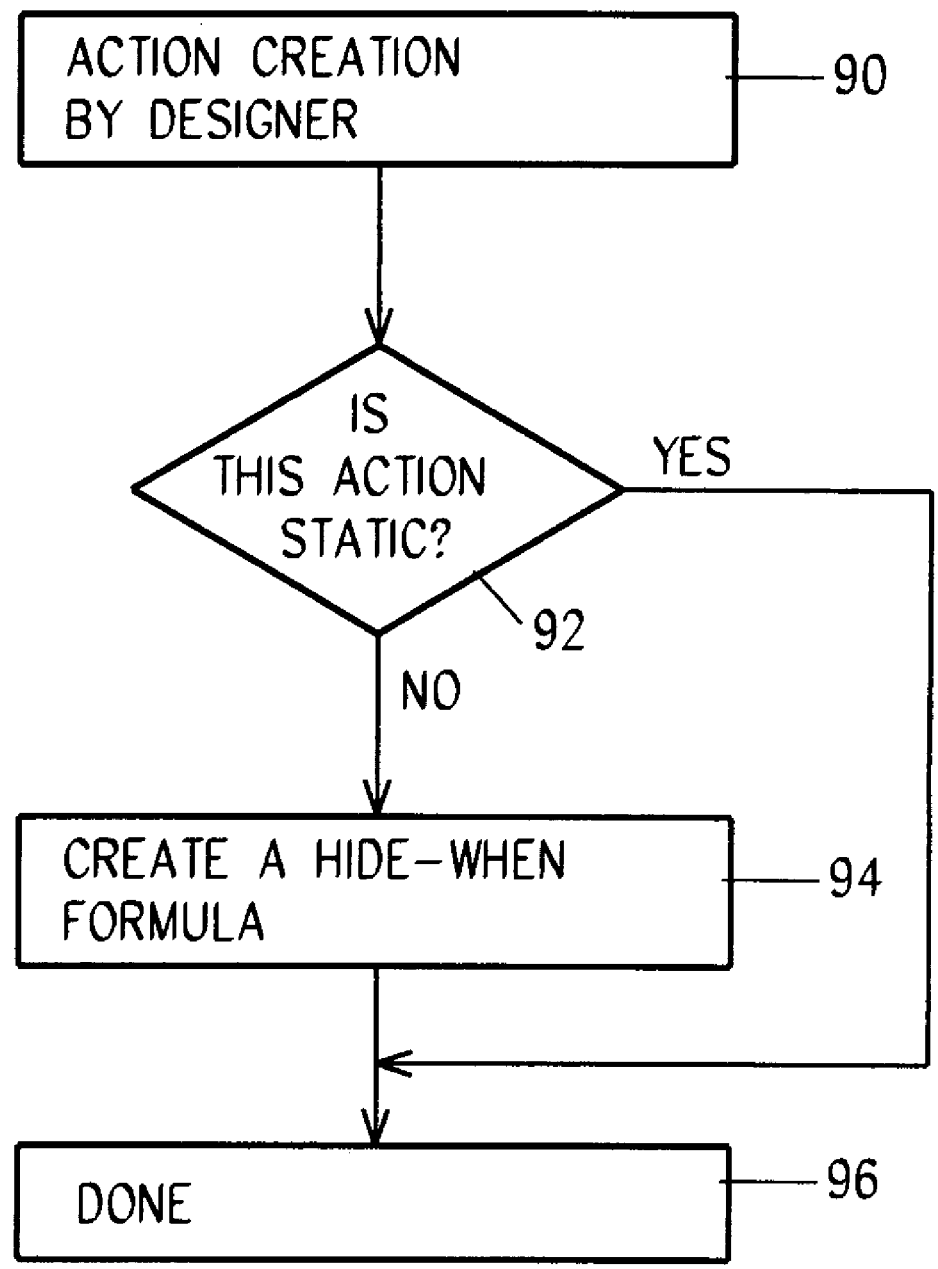
FIG. 4 is a flow chart illustrating method steps for creation of static and dynamic actions.

Referring to FIG. 4, as actions are created by a product designer or application developer for a particular application, in step 92 it is determined if the action is to be static or dynamic. If dynamic, in step 94 the designer/developer creates a hide-when formula.

Figure 5:
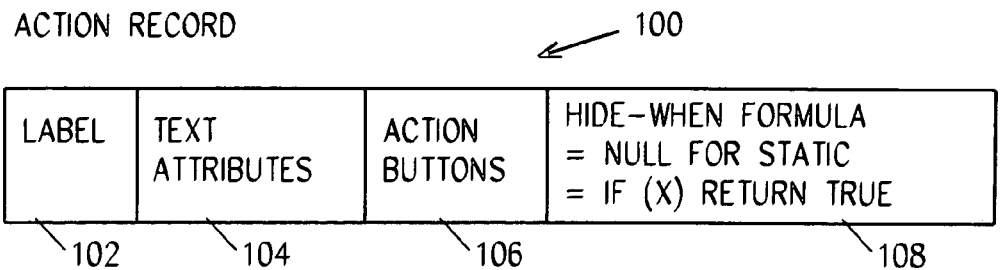
FIG. 5 is a schematic representation of an action record.

Referring to FIG. 5, an action record 100 is created for each action which includes label 102, text attributes 104 (including fonts, colors, background and border attributes), action buttons 106 which define what is to be done if the action button is selected (such as, reply, forward, create new memo, and so forth), and hide-when formula 108. Formula 108 is set to null for static actions (those which are not to be evaluated dynamically as a user selects successive documents for the view panel 40). Formula 108 for dynamic actions specifies the conditions under which to return true, and typically references fields or data in the relevant document.

Figure 6:
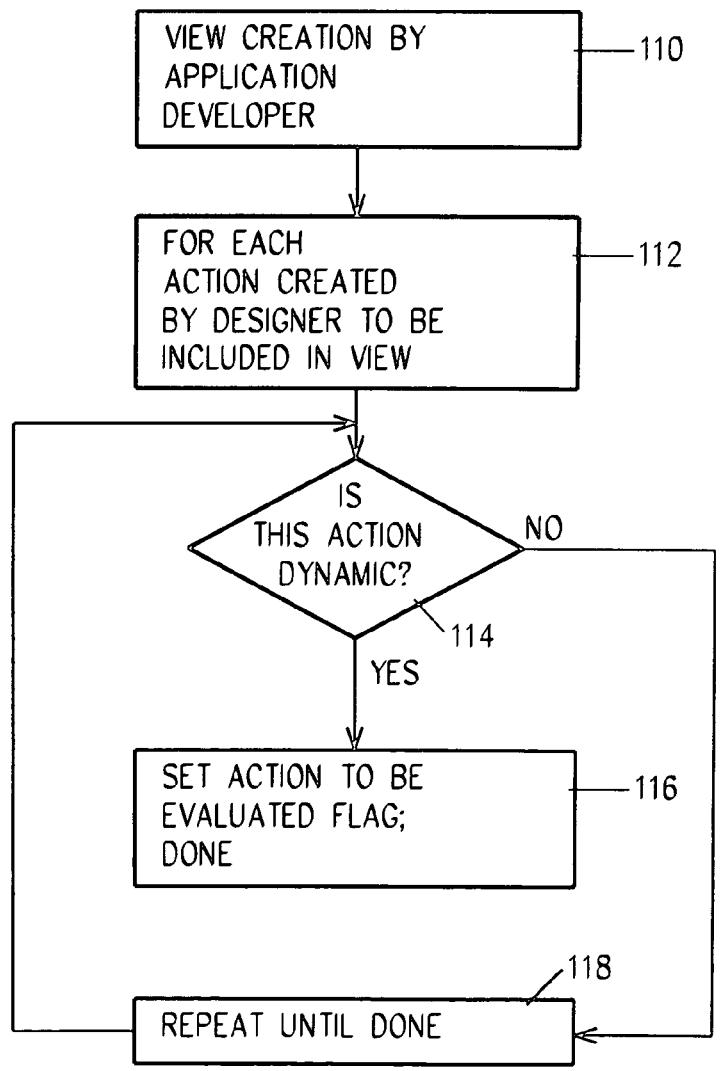
FIG. 6 is a flow chart illustrating the creation of a view including dynamic actions.

Referring to FIG. 6, in step 110 an application developer creates a view. Step 114, for each action initialized (FIG. 4), determines from action record 100 relevant to this view if the action is static or dynamic. Hide-when formula 108 will be null for static actions. In step 116, for dynamic actions, the developer sets an action to be evaluated flag 128 in view record 120. Once step 116 evaluates to "yes", the process is done—there is no need to go to a next action.

Figure 7:
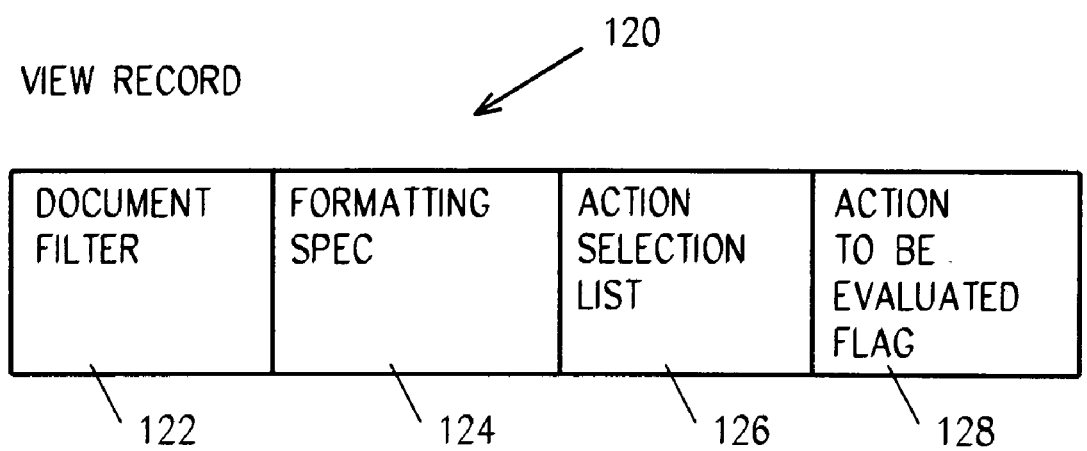
FIG. 7 is a schematic representation of a view record.
Figure 8:
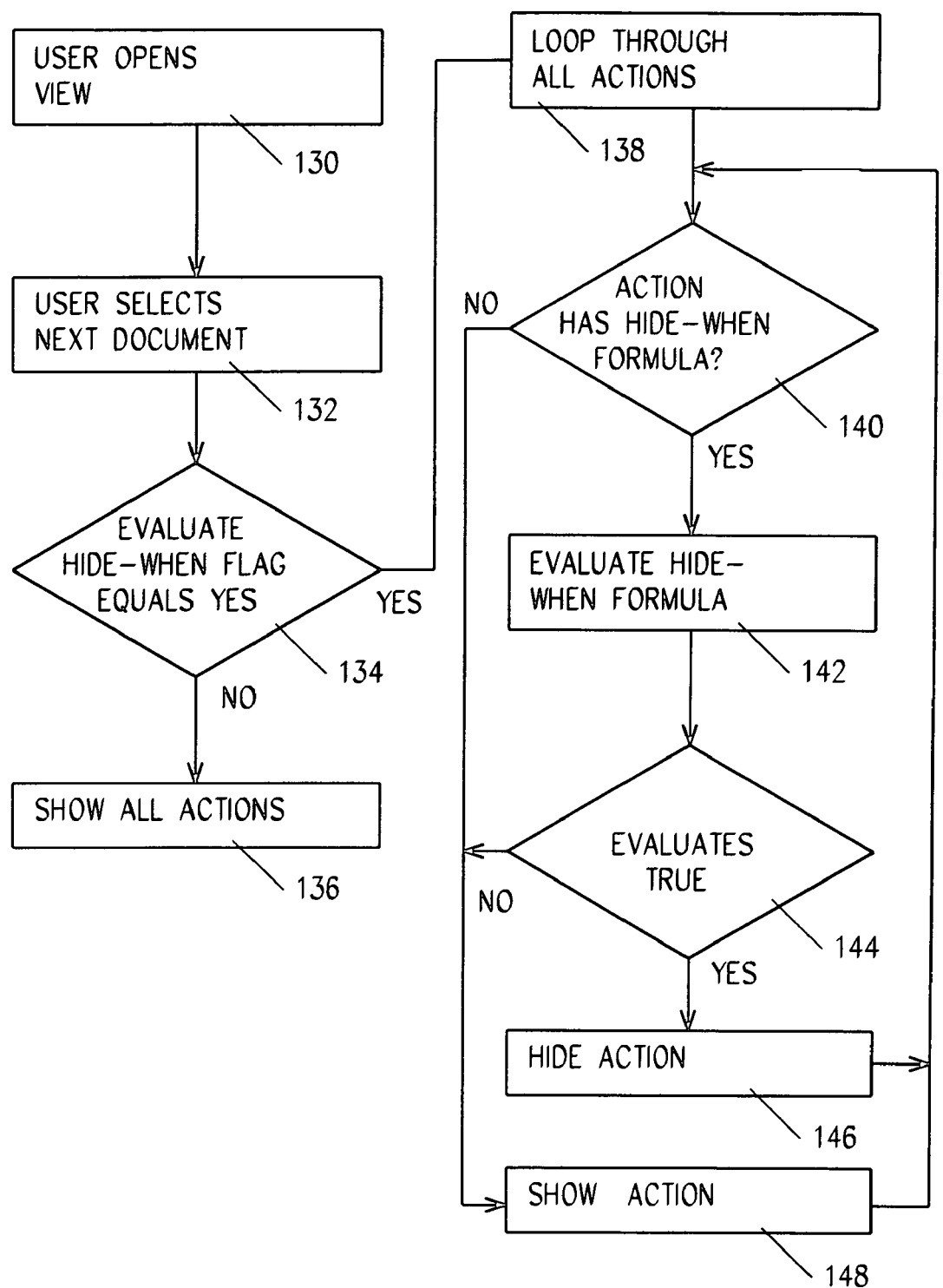
FIG. 8 is a flow chart illustrating selective show and hide of actions as a user opens a view and selects successive documents within that view.

Referring to FIG. 7, view record 120 includes document filter 122, which is a formula in, for example, Lotus Script or Java script, to define a subset of documents—those documents to be shown in the view; formatting specifications 124; action selection list 126, a list of actions to show in this view; and action to be evaluated flag 128, which returns true or false whether the actions of list 126 are to be evaluated—this is the evaluate hide-when flag.

Referring to FIG. 7, the process executed as a user opens a first 130 and successive documents 132 in a view includes in step 134 evaluating hide-when flag 128 to determine if actions for this view are to be evaluated as dynamic or static. If flag 128 returns no, in step 136 all actions defined for this view are shown. If flag returns yes, in step 138 processing loops through the action records 100 for all actions in selection list 126. If this action has a hide-when formula 108, in step 142 that formula is evaluated. If there is no hide-when formula (field 108 is null) or if the hide-when formula from field 108 returns true, then in step 148, this action is shown in the view. Otherwise, in step 146 the action is hidden, and not presented in the view. There is only one flag in the view which when present forces the view to go through all of the actions for evaluating hide-when.

In most applications, a user is presented a set of actions that can be used. For example, in a to do list, the user is presented with a list of tasks with respect to which several actions may be taken, such as marking incomplete actions completed or other actions incomplete. Previously, the list of available action has been static, and is not reevaluated for each document presented. In accordance with the preferred embodiments of the invention, the list of available actions may be dynamically evaluated for each document brought to view through the use of the hide-when flag for a view and hide-when formula for each action, as discussed above.

ADVANTAGES OVER THE PRIOR ART

It is an advantage of the invention that there is provided an improved system and method for presenting actions which may be executed with respect to a document in a view.

It is an advantage of the invention that there is provided a system and method for dynamically evaluating actions which may be executed with respect to successive documents in a view.

It is an advantage of the invention that there is provided a system and method whereby actions which may be executed with respect to a view may be dynamically evaluated and selectively hidden or shown for successive view panel content.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method for operating a digital computer to dynamically select and display in a graphical user interface of a computer display device an action bar presenting only actions appropriate with respect to successive documents presented in a current view based on document properties, comprising the steps of:

during action creation, operating said computer to provide in an action list a record for each action including text attributes and action button, define a hide-when formula for each dynamic action by reference to a current document field, and set said hide-when formula to null for each static action, static actions being those actions which are not to be evaluated dynamically as a user selects successive documents;

during view creation, operating said computer to define for said view a view record including a document filter, formatting specification, action selection list, and a hide-when flag, and further to define in said action selection list a plurality of actions applicable to said view and, responsive to at least one said action being a dynamic action, to set said hide-when flag to characterize said view as a view to be dynamically evaluated for each document selected for presentation in said view;

responsive to user selection of a next document for presentation in a current view, which current view is characterized by said hide-when flag by being set as a view to be evaluated, operating said computer to dynamically evaluate for said next document each action in said action list applicable to said current view with respect to its respective hid-when formula and display in an action bar for said current view for said next document only those actions for which said hide-when formula is set to null and those actions for which a hide-when exists and evaluates as an action to be displayed; and responsive to user selection of a next document for presentation in said in said current view, which current view is characterized by said hide-when flag as not to be evaluated, operating said computer to display for said next document in said action bar of said current view all actions applicable to said current view.

2. System for presenting actions which may be executed with respect to a document presented in a view of a computer display, comprising:
   a digital computer;
   a display device;
   a digital storage device;
   said storage device storing for each prospective static and dynamic action selectable by a user of said display device, an action record selectively including hide-when evaluation indicia;
   said storage device storing for each prospective view for display of documents on said display device, a view record including an action selection list of static and dynamic actions which may be selected by said user with respect to a document displayed in a view, and an action-to-be-evaluated flag for said view, said action to be evaluated flag being set to true for said view if at least one action in said action selection list is a dynamic action and to null if all actions in said action selection list are static actions, static actions being those actions which are not to be evaluated dynamically as a user selects successive documents;
   said hide-when evaluation indicia selectively providing for each said dynamic action a hide-when formula which selectively references a field of a current document and evaluates to one of action hide and action display;
   said computer responsive to user selection of a next document for display in a graphical user interface a current view and to said action-to-be-evaluated flag being set for said current view for dynamically evaluating said action record for each said action to identify for said current view only static actions and those dynamic actions for which said hide-when formula evaluates for said next document to action display; and
   said display presenting to said user a current view panel in said graphical user interface including said current document and in a view action bar, an action list dynamically configured to hide prospective actions for which said hide-when evaluation indicia evaluates to hide for said current document.

3. A computer program product for operating a digital computer to dynamically select and display actions appropriate with respect to successive documents presented in a current view at a display device, said computer program product comprising:
   a computer readable medium;
   said computer readable medium consisting of at least one of a semiconductor, solid state memory, magnetic tape, removable computer diskette, random access memory, read only memory, rigid magnetic disc, and an optical disc;
   first program instructions, operable during action creation, to operate said computer to provide for each action a record including text attributes and action button, define a hide-when formula for each dynamic action by reference to a current document field, and set said hid-when formula to null for each static action, static actions being those actions which are not to be evaluated dynamically as a user selects successive documents;
   second program instructions, operable during creation of a view, to operate said computer to define for said view a view record including a plurality of actions for display in an action bar of said view, said view record including a document filter, a formatting specification, action selection list, and a hide-when flag, and further to define in said action selection list a plurality of actions applicable to said view and, responsive to at least one said action being a dynamic action, to se said hide-when flag to characterize said view as a view to be dynamically evaluated for each document selected for presentation in said view;
   third program instructions, responsive to user selection of a next document for presentation in a current view, which current view is characterized by said hide-when flag by being set as a view to be evaluated, to operated said computer to dynamically evaluate for said next document each action applicable to said current view with respect to its respective hide-when formula and display in said action bar of said current view for said next document only those actions for which said hide-when formula is set to null and those actions for which a hide-when formula exists and evaluates as an action to be displayed;
   and fourth program instructions, responsive to user selection of a next document for presentation in said current view, which current view is characterized by said hide-when flag as not to be evaluated, to operate said action bar of said current view all actions applicable to said current view; and wherein
   said first, second, third, and fourth program instructions are recorded on said medium.

* * * * *